US008365257B1

(12) United States Patent
Causey et al.

(10) Patent No.: US 8,365,257 B1
(45) Date of Patent: Jan. 29, 2013

(54) SECURE WEB PORTAL WITH DELEGATED SECURE ADMINISTRATION

(75) Inventors: Stanley Eugene Causey, Lorton, VA (US); Cuong Phat Duong, Olathe, KS (US); Bryan Scott Sowell, Prairie Village, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 901 days.

(21) Appl. No.: 11/757,117

(22) Filed: Jun. 1, 2007

(51) Int. Cl.
*G06F 7/04* (2006.01)
(52) U.S. Cl. .............................. 726/5; 713/156; 713/158
(58) Field of Classification Search .................. 713/156, 713/158; 726/5
See application file for complete search history.

(56) References Cited

U.S. PATENT DOCUMENTS

| 6,324,645 | B1* | 11/2001 | Andrews et al. ............... 713/157 |
| 7,028,180 | B1* | 4/2006 | Aull et al. ...................... 713/156 |
| 7,496,191 | B1* | 2/2009 | Crews et al. ............. 379/220.01 |
| 2001/0047343 | A1* | 11/2001 | Dahan et al. .................... 705/76 |
| 2003/0069742 | A1* | 4/2003 | Lawrence .......................... 705/1 |
| 2003/0084280 | A1* | 5/2003 | Bryan et al. .................. 713/153 |
| 2003/0126431 | A1* | 7/2003 | Beattie et al. ................. 713/156 |
| 2003/0142797 | A1* | 7/2003 | Troy et al. ................... 379/88.12 |
| 2007/0165208 | A1* | 7/2007 | Cowburn et al. ................ 356/71 |

OTHER PUBLICATIONS

Choi. (2005). The Digital Certificate Journey from RACF to PKI Services Part 2. Retrieved Jun. 15, 2006 from ftp://ftp.software.ibm.com/eserver/zseries/zos/racf/pdf/r05_pki_services.pdf.*
Public Key Infrastructure, 2004.*
PCreview (Feb. 2004). Requesting a certificate for another user blog posting. Retrieved from http://www.pcreview.co.uk/forums/requesting-certificate-another-user-t1590076.html.*

* cited by examiner

*Primary Examiner* — Ashok Patel
*Assistant Examiner* — Brian Shaw

(57) ABSTRACT

A web portal for issuing multiple digital certificates to users of an entity (e.g., a law-enforcement agency or corporation) is described herein. The digital certificates enable users to access confidential records—such as telecommunication records—by requesting the records through a web site. A master digital certificate is issued for the entity, and a user associated with the master digital certificate can request slave certificates to be issued to other employees or affiliates of the entity. A certificate provisioning server is configured to only issue slave certificates at the request of the user with the master digital certificate. Once issued, a slave certificate is communicated to an authentication server, which notifies the assignee of the slave certificate of its online location.

17 Claims, 8 Drawing Sheets

SECURE WEB PORTAL WITH DELEGATED SECURE ADMINISTRATION

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

One aspect of the invention is directed to a web portal for issuing multiple digital certificates to users of an entity (e.g., a law-enforcement agency or corporation). The digital certificates enable users to access confidential records—such as telecommunication records—stored on a tracking server. For each entity, a master digital certificate is issued, and a user associated with the master digital certificate can request slave certificates to be issued to other employees or affiliates of the entity. A certificate provisioning server is configured to only issue slave certificates at the request of the user with the master digital certificate. Once issued, a slave certificate is communicated to an authentication server, which notifies the assignee of the slave certificate of its online location. Users can then download the slave certificate by following a link provided in the notification.

Another aspect of the invention is directed to determining whether to issue or modify slave certificates. The certificate provisioning server receives requests to issue or modify slave certificates. Additionally, the certificate provisioning server determines whether the requests were submitted by a user with a master profile. If so, the certificate provisioning server will either issue, revoke, lock, unlock, or modify roles assigned to a slave certificate.

BRIEF DESCRIPTION OF THE SEVERAL VIEWS OF THE DRAWINGS

The present invention is described in detail below with reference to the attached drawing figures, wherein.

DETAILED DESCRIPTION

Figure 1:
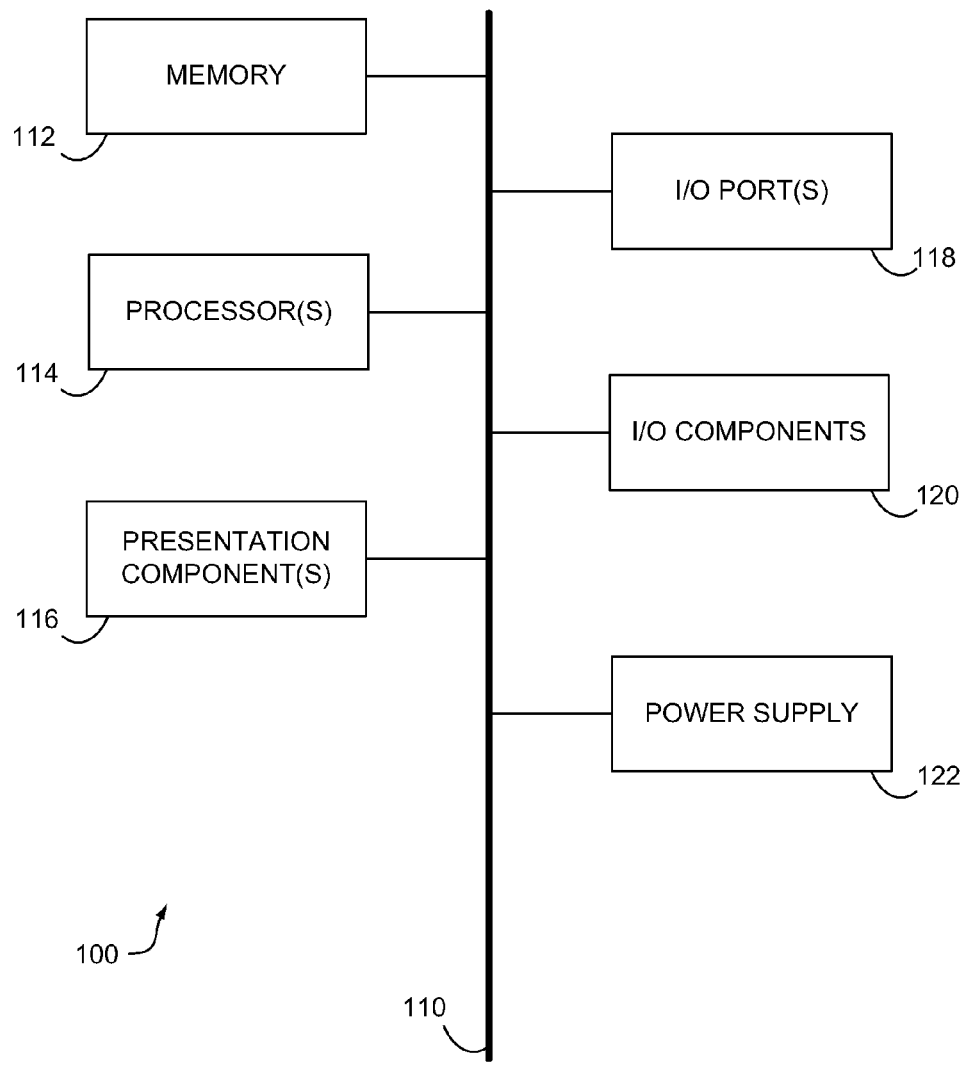
FIG. 1 is a block diagram of an exemplary operating environment for use in implementing an embodiment of the present invention.

The subject matter described herein is presented with specificity to meet statutory requirements. The description herein, however, is not intended to limit the scope of this patent. Rather, it is contemplated that the claimed subject matter might also be embodied in other ways, to include different steps or combinations of steps similar to the ones described in this document, in conjunction with other present or future technologies. Moreover, although the term "block" may be used herein to connote different elements of methods employed, the term should not be interpreted as implying any particular order among or between various steps herein disclosed.

Many telecommunication providers, or organizations that maintain confidential records, require authorization to access the records of their subscribers. For example, a police officer or an agent in the Federal Bureau of Investigation (FBI) typically cannot access a cell-phone subscriber's call records without a court-ordered subpoena. To comply with subpoenas, or other documents that need verification, the telecommunications provider has to verify each document as well as the requesting agent or officer before issuing records. Complying with a large number of such requests can be extremely time-consuming and expensive for the telecommunications provider.

Embodiments described herein generally relate to a delegated administrative model of creating and distributing software certificates to entities. Entities, as described herein, may refer to any organization or agency—such as, for example but without limitation, law-enforcement agencies, government agencies, corporations, private organizations, or the like. In one embodiment, an entity registers a master profile with a telecommunications provider. The master profile is referred to herein as a point of contact (POC). In one embodiment, a POC is a software certificate that is downloaded to a web browser. In one embodiment, the POC is authorized by an administrator of the telecommunications provider and issued to a particular user at an entity. Once a POC is created, the user it is issued to can create additional software certificates for employees of the entity. For the sake of clarity, additional software certificates (i.e., certificates that are not POCs) are referred to herein as slave certificates. Each slave certificate, in one embodiment, is a software certificate enabling its user to submit requests for records to a telecommunications provider. Without either a POC or a slave certificate, a user cannot request confidential records from the telecommunications provider. Consequently, the telecommunications provider only needs to authenticate the request for records (e.g., a subpoena), not the employee of the entity submitting the record.

While subpoenas are repeatedly discussed herein, embodiments contemplate other requests for information. Furthermore, telecommunications providers are routinely discussed herein; however, embodiments contemplate any entity maintaining records. For example, a wholesaler may wish to implement embodiments described herein to verify requests from retailers. One skilled in the art will appreciate that various implementations described herein may easily be integrated to different entities.

A user associated with a POC may create, edit, and disable slave certificates. For instance, the POC may be used to issue a slave certificate to employees of the entity. If employees leave the entity, the POC can be used to disable their slave certificates. Moreover, various roles may be assigned to a slave certificate. For example, a slave certificate may be configured to allow users to view all the requests submitted from the entity, view only the requests submitted by the user associated with the slave certificate, or manage users in an administrative role. Roles may also be changed, in some embodiments, by a user associated with the POC. Additionally, certificates may be configured to lapse after a specific amount of time—for example, after a year. One skilled in the art will appreciate that certificate expiration may be a native feature in some digital certificates, such as those utilizing the X.509 protocol.

Various types of software certificates may be issued as a POC or slave certificate. In one embodiment, both POC and slave certificates are digital certificates that implement the X.509 standard for a public key infrastructure (PKI), designed by the ITU Telecommunication Standardization Sector (ITU-T). One skilled in the art will understand that X.509 certificates typically use root certificates (i.e., public key certificate or self-signed certificate) to utilize an entity's PKI system.

In one embodiment, POC and slave certificates are downloaded to a web browser—such as Internet Explorer®, Netscape Navigator, Mozilla, or Opera—executing on a computing device. Web browsers typically have root certificates preinstalled, making POC and slave certificates instantly compatible, in some embodiments, because the certificates are compatible with the web browser. For those certificates that are not compliant with a preinstalled root certificate, it may be necessary to download a root certificate or verify the certificates in another well-known way. For instance, browser cookies, java controls, or ActiveX controls may be implemented to verify either the POC or any slave digital certificate. POCs and slave certificates do not have to be based on the X.509 protocol; rather, one skilled in the art will appreciate that numerous other digital certificates may be used in alternative embodiments.

Embodiments described herein may be embodied as, among other things: a system, method, computer-program product, or graphical user interface (GUI). In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include, without limitation, computer-useable instructions, data structures, program modules, and other data representations. Computer-storage media include, but are not limited to Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices; or any other medium that can be used to encode desired information and be processed by a computing device. These memory components can store data momentarily, temporarily, or permanently.

Combinations of the above are included within the scope of computer-readable media.

Referring now to FIG. 1, an exemplary operating environment for implementing the present invention is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In one embodiment, computing device 100 is a personal computer. But in other embodiments, computing device 100 may be a hand-held device, cellular phone, Worldwide-Interoperability-for Microwave-Access-enabled (WiMAX-enabled) device, fourth-generation-cellular-enabled (4G-enabled) device, consumer electronic, general-purpose computer, specialty computing device, etc.

The invention may be described in the general context of computer code or machine-useable instructions, including computer-executable instructions such as program modules, being executed by a computer or other machine, such as a PDA or other handheld device. Generally, program modules including routines, programs, objects, components, data structures, and the like, refer to code that perform particular tasks or implement particular abstract data types. Each module described herein may represent executable source code written in a well-known language, such as, for example, C, C++, C#, Java, or the like. Additionally, software features (e.g., web-browser add-ons, the menu, or the option menu) described herein may be implemented using code written in a markup or scripting language—for example, without limitation, hypertext markup language (HTML), extensible markup language (XML), JavaScript, VBscript, or the like.

Embodiments described herein may be practiced in a variety of system configurations, such as, for example, computing device 100. Embodiments described herein may also be practiced in distributed computing environments where tasks are performed by remote-processing devices that are linked through a communications network. For example, a computing device 100 may communicate with a server to accomplish different aspects of the embodiments described herein.

With continued reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. It will be understood by those skilled in the art that such is the nature of the art, and, as previously mentioned, the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave, or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, cache, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

In operation, computing device 100 is loaded with a software application capable of retrieving and viewing web pages or other online documents. Such an application is commonly referred to as a web browser. Examples of web browsers include, without limitation, Internet Explorer®, Firefox, Mozilla, Opera, or the like. As one skilled in the art will appreciate, web browsers are capable of submitting requests for and rendering web content (e.g., web pages, images, video, audio, etc.).

Figure 2:
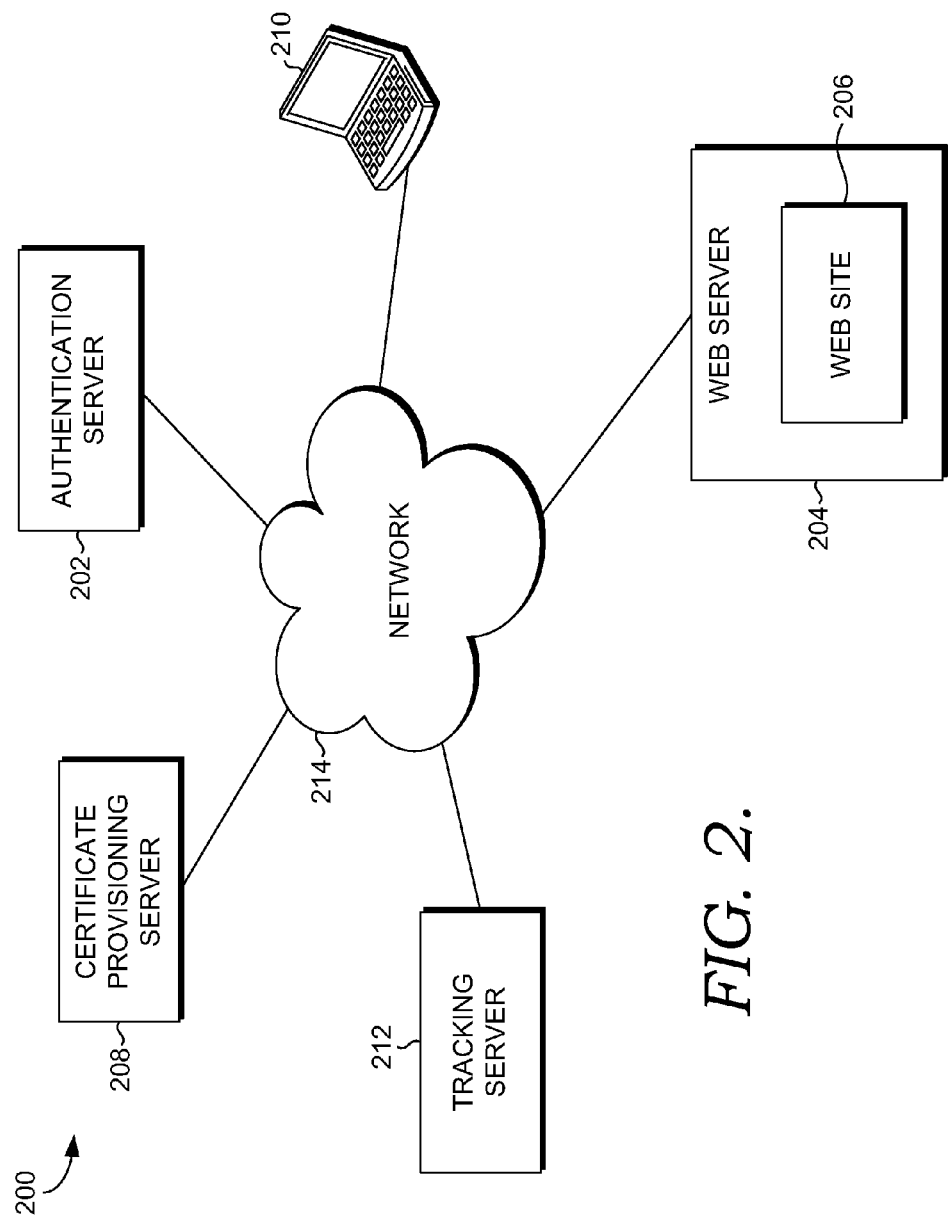
FIG. 2 is a block diagram of a networking environment for use in implementing an embodiment of the present invention.

Turning now to FIG. 2, a block diagram depicting a networking architecture 200 is shown for use in implementing an embodiment of the present invention. The networking architecture 200 comprises a client computing device 210, authentication server 202, web server 204, certificate provisioning server 208, and tracking server 212—all of which communicate with each other via network 214. While the networking architecture 200 illustrates an exemplary embodiment of the present invention, other embodiments including different components or not including all of the illustrated components are also possible.

The client computing device 210 may be any type of computing device, such as device 100 described above with reference to FIG. 1. By way of example only but not limitation, the client computing device 210 may be a personal computer, desktop computer, laptop computer, handheld device, cellular phone, digital phone, smartphone, PDA, or the like. But it should be noted that embodiments are not limited to implementation on such computing devices.

The authentication server 202, the web server 204, the tracking server 212, and the certificate provisioning server 208 may comprise any application server, database server, or file server configurable to perform the methods described herein. In addition, each of the authentication server 202, the web server 204, and the certificate provisioning server 208 may be a dedicated or shared server.

Components of authentication server 202, the web server 204, and the certificate provisioning server 208 may include, without limitation, a processing unit, internal system memory, and a suitable system bus for coupling various system components, including one or more databases for storing information (e.g., files and metadata associated therewith). Each server typically includes, or has access to, a variety of computer-readable media.

While each of the authentication server 202, the web server 204, the tracking server 212, and the certificate provisioning server 208 is illustrated as a single box, one skilled in the art will appreciate that they are scalable. For example, the web server may in actuality include 100 servers in communication. The single unit depictions are meant for clarity, not to limit the scope of embodiments in any form.

Network 214 may include any computer network or combination thereof. Examples of computer networks configurable to operate as network 214 include, without limitation, a wireless network, landline, cable line, fiber-optic line, local area network (LAN), wide area network (WAN), metropolitan area network (MAN), or the like. Network 214 is not limited, however, to connections coupling separate computer units. Rather, network 214 may also comprise subsystems that transfer data between servers or computing devices. For example, network 214 may also include a point-to-point connection, the Internet, an Ethernet, a backplane bus, an electrical bus, a neural network, or other internal system.

In an embodiment where network 214 comprises a LAN networking environment, components are connected to the LAN through a network interface or adapter. In an embodiment where network 214 comprises a WAN networking environment, components use a modem, or other means for establishing communications over the WAN, to communicate. In embodiments where network 214 comprises a MAN networking environment, components are connected to the MAN using wireless interfaces or optical fiber connections. Such networking environments are commonplace in offices, enterprise-wide computer networks, intranets, and the Internet. It will be appreciated that the network connections shown are exemplary and other means of establishing a communications link between the computers may also be used.

In one embodiment, the client computing device 210, the authentication server 202, the web server 204, and the certificate provisioning server 208 communicate via network 214 by transmitting data back and forth using a transfer protocol. One skilled in the art will understand that various transfer and networking protocols may be used—for example, without limitation, the hypertext transfer protocol (HTTP), file transfer protocol (FTP), secure HTTP (HTTPS), secure sockets layer (SSL), secure shell (SSH), or the like.

The web server 204 hosts a web site 206 that enables users of the client computing device 210 to request slave certificates and allows users with slave certificates to submit requests for records. A user can access the web site 206 on the client computing device 210 by navigating to the web site 206 through the Internet (i.e., requesting a uniform resource locator (URL) associated with the web site 206). Through the web site 206, a user with a POC (referred to herein as the POC user) may issue, disable, or manage slave certificates. Moreover, the web site 206 may be configured to only be accessible to users with either a POC or slave certificate.

In one embodiment, a POC is issued by an administrator at a telecommunications provider for a user in an entity. Once issued, the POC is communicated to the user, who can then download it. In one embodiment, the POC is an X.509 digital certificate. In addition, the POC may be installed into a web browser accessed by the user. One skilled in the art will understand that various other digital certificates may be issued and downloaded in a plethora of ways.

In one embodiment, the POC user submits a request for the issuance of a slave digital certificate by submitting a host of information about a user to the certificate provisioning server 208. In one embodiment, the request is transmitted using the HTTPS protocol. Examples of the information in the request include, without limitation, a user's name, default password, e-mail address, professional title, phone number, fax number, and role assignment. In particular, role assignment refers to the authoritative role assigned to a user. For example, the user may be authorized to submit and view their own requests for records, view all requests for records submitted through the entity, or act as an administrator. Administrators may be granted a number of rights. For example, they may be allowed to revoke certificates, issue certificates, or change roles assigned to slave certificates.

The certificate provisioning server 208 is configured to receive the information submitted by the POC user and issues a slave certificate for a different user. Before the slave certificate is issued, however, the certificate associated with the POC user is first verified (in one embodiment). To do so, the certificate provisioning server 208 may be configured to execute a web service that determines whether the request originated from a trusted POC. To request the issuance of a slave certificate, a POC user can access an administrative interface presented in a web page of the web site. The administrative interface communicates various details of the certificate associated with the POC user (i.e., the POC certificate) to the web service. To verify a POC user, the web service uses the details to determine whether the POC certificate was issued by a trusted authority for issuing POC certificates (i.e., an authoritative user with the telecommunications provider). Additionally, a table of valid POC-certificate details may be queried to determine whether the requesting POC certificate's details match those of the entity associated with the POC user. For example, a certificate of an FBI POC user will be checked to determine whether it was issued by the telecommunications provider's trusted authority, as well as whether it is actually assigned to the FBI. Details associated with the POC certificate may include, for example but without limitation, an IP address, password, user profile information, geographic location, name, certificate status using the online certificate status protocol (OCSP), public key, private key, hash value, and any other well-known data associated with digital certificates.

In one embodiment, if the POC certificate was issued by the trusted authority and the POC certificate is associated with POC user's entity, requests from the certificate provisioning server 208 will process requests from the POC user. The requests may be submitted through the administrative interface as encrypted requests to the provisioning server 208 using any well-known secure protocols. Examples of the requests include, without limitation, issuing, revoking, locking, unlocking, or otherwise managing slave certificate requests.

In one embodiment, request includes an indication specific to the certificate provisioning server 208 indicative of the request's origination from the administrative interface. In response, the certificate provisioning server 208 may be configured to reply to the administrative interface with the status or details of the request. For example, in response to a request to issue a slave digital certificate, the certificate provisioning server 208 may be configured to reply with the activation information for a user to download the slave certificate. In another example, in response to a request to revoke a slave digital certificate, the certificate provisioning server 208 may be configured to revoke the slave certificate and communicate such to the administrative interface, which will remove the revoked certificate from a display to the POC user.

In some embodiments, digital slave certificates are transmitted to the authentication server 202, which is configured, in one embodiment, to communicate a notification message (e.g., an e-mail, text message, or voice message) to the slave certificate's user. The notification message will send the user activation details in order to obtain the digital certificate. The slave certificate's user can follow the hyperlink to a web page (not shown for clarity) where the slave certificate can be obtained by following the activation details In one embodiment, the slave certificate is downloaded to the slave certificate user's web browser. In another embodiment, the user is provided with authentication credentials (e.g., password, user name, etc.) that can be entered in the web site 206 to use the slave certificate. One skilled in the art will recognize that various other implementations are also possible for delivering and using slave certificates.

Users can use downloaded slave certificates to access records in the tracking server 212. The tracking server 212 is configured to store, maintain, and access the telecommunications provider's records. Such records may include call-detail records, voice-mail messages, text messages, short message service (SMS) messages, picture messages, multimedia messaging service (MMS) messages, and the like may all be stored and accessed by the tracking server 212. Call-detail records include, for example but without limitation, incoming phone numbers, outgoing phone numbers, subscriber information (e.g., name, address, date of birth, social security number, etc.), global positioning system (GPS) locations, cell towers a device has registered with, or the like. Moreover, the tracking server 212 may also be configured to plug in to ongoing phone calls (i.e., a wiretap).

In one embodiment, access to the records stored by the tracking server 212 is limited to user's with valid slave certificates or slave certificates with valid roles. Additionally, the tracking server 212 may also be configured to only provide records to users submitting appropriate, additional information. For example, the tracking server 212 may require a valid subpoena number or copy of the subpoena before releasing records. Users can enter additional information into different windows of the web site 206—for instance, a window may exist for entering subpoena information. The entered information is sent to the tracking server 212—via an HTTPS request, in one embodiment—which is configured to determine whether the information is accurate or sufficient enough to initiate the release of records. One skilled in the art will appreciate that other information may alternatively be required by the tracking server 212 before records are released and various web-site windows may be created to facilitate the entry of such information.

Figure 3:
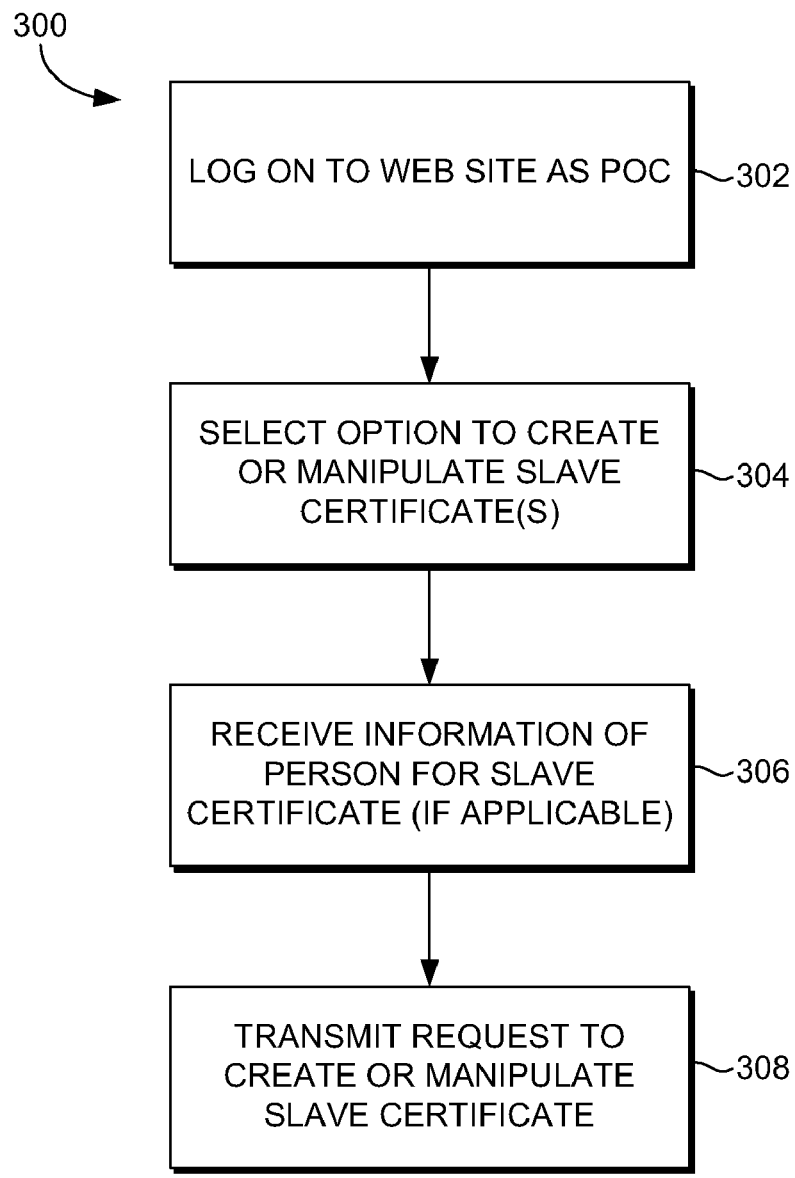
FIG. 3 is a flowchart illustrating a process for requesting a digital certificate, according to an embodiment of the present invention.

Turning now to FIG. 3, a flowchart is provided illustrating a process 300 for requesting a slave digital certificate, according to an embodiment of the present invention. Initially, a user logs on to a web site (such as the web site 206) as a POC user, as indicated at block 302. On the web site, the user can select various options to create or manipulate one or more slave certificates, as indicated at block 304. Manipulation of a slave certificate may refer to, for example, locking, unlocking, disabling, or changing roles assigned to the certificate. One skilled in the art will understand that such actions may be performed by a server maintaining the slave certificate (e.g., the certificate provisioning server 208).

Locking a slave certificate means that it cannot be used to access records of a telecommunications provider, or the web site (in some embodiments). In one embodiment, a slave certificate is locked if a user tries to use the certificate but enters an incorrect password too many times—i.e., beyond a threshold number of times. The slave certificate may be unlocked, meaning rights are returned, by a POC user. Furthermore, a slave certificate may be disabled, meaning it can never again be used to access records of the telecommunications provider, or the web site (in some embodiments).

If the POC user has selected to issue a slave certificate, the POC user is prompted for information relating to the certificate's assignee, as indicated at 306. For instance, the POC user may have to provide a name, default password, e-mail address, professional title, phone number, or fax number associated with the assignee. Additionally, the POC user may indicate the role to assign the slave certificate (e.g., view the assignees cases, view all cases, or administrator). The information entered by the POC user is submitted along with a request to issue the slave certificate to a server (e.g., the certificate provisioning server 208), as indicated at 308. In one embodiment the request and information are communicated to the server using the HTTPS protocol. Any of the aforementioned transfer protocols may alternatively be used.

Figure 4:
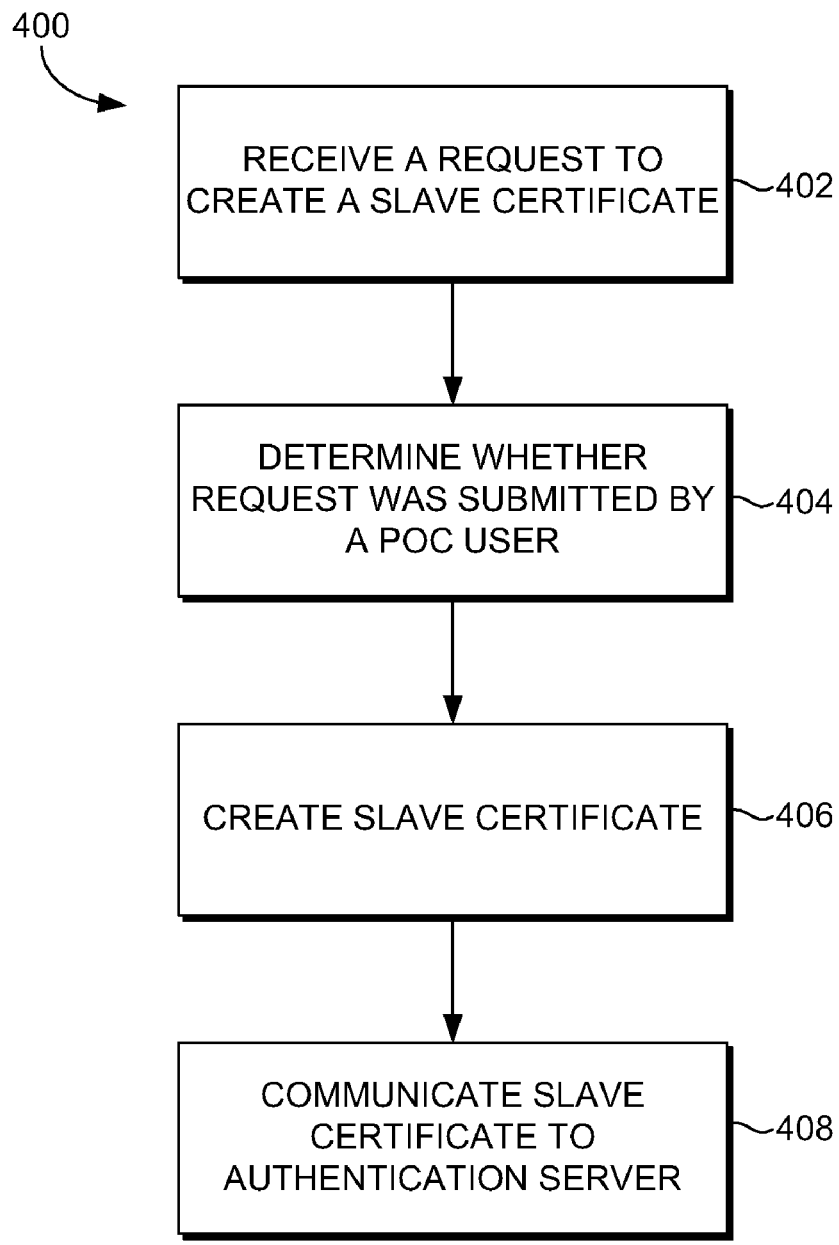
FIG. 4 is a flowchart illustrating a process for issuing a digital certificate, according to an embodiment of the present invention.

FIG. 4 is a flowchart illustrating a process 400 for issuing a slave digital certificate, according to an embodiment of the present invention. Initially, a POC is assigned to a user associated with an entity, as indicated at 402. A server receives a request to create a slave certificate as indicated at 404. Additionally, the server may also receive information specific to a user for whom the slave certificate should be issued. In one embodiment, the request is received over a secure transfer protocol (e.g., HTTPS or SSL). The server verifies the identity of the POC user submitting the request, as indicated at 406. If the request was not submitted by an authorized POC user, the request is denied. But if the POC user is authentic, the slave certificate is created, as indicated at 408.

Once created, the slave certificate is communicated to an authentication server (indicated at 410). The authentication server may be configured to send a notification (e.g., e-mail, text message, voice message) to the user assigned to the slave certificate. The notification, in one embodiment, includes a reference number, authentication code, and hyperlink for downloading the slave certificate. The user can then follow the link to a web page where the slave certificate can be retrieved and retrieve the slave certificate by entering the correct reference number and authentication code.

FIG. 3 and FIG. 4 are described above with reference to issuing a slave certificate. Similar processes may also be used to lock, unlock, disable, or change roles assigned to slave certificates. In other words, the POC user may perform the aforementioned tasks by submitting requests through the web site described in reference to FIG. 3.

Figure 5A:
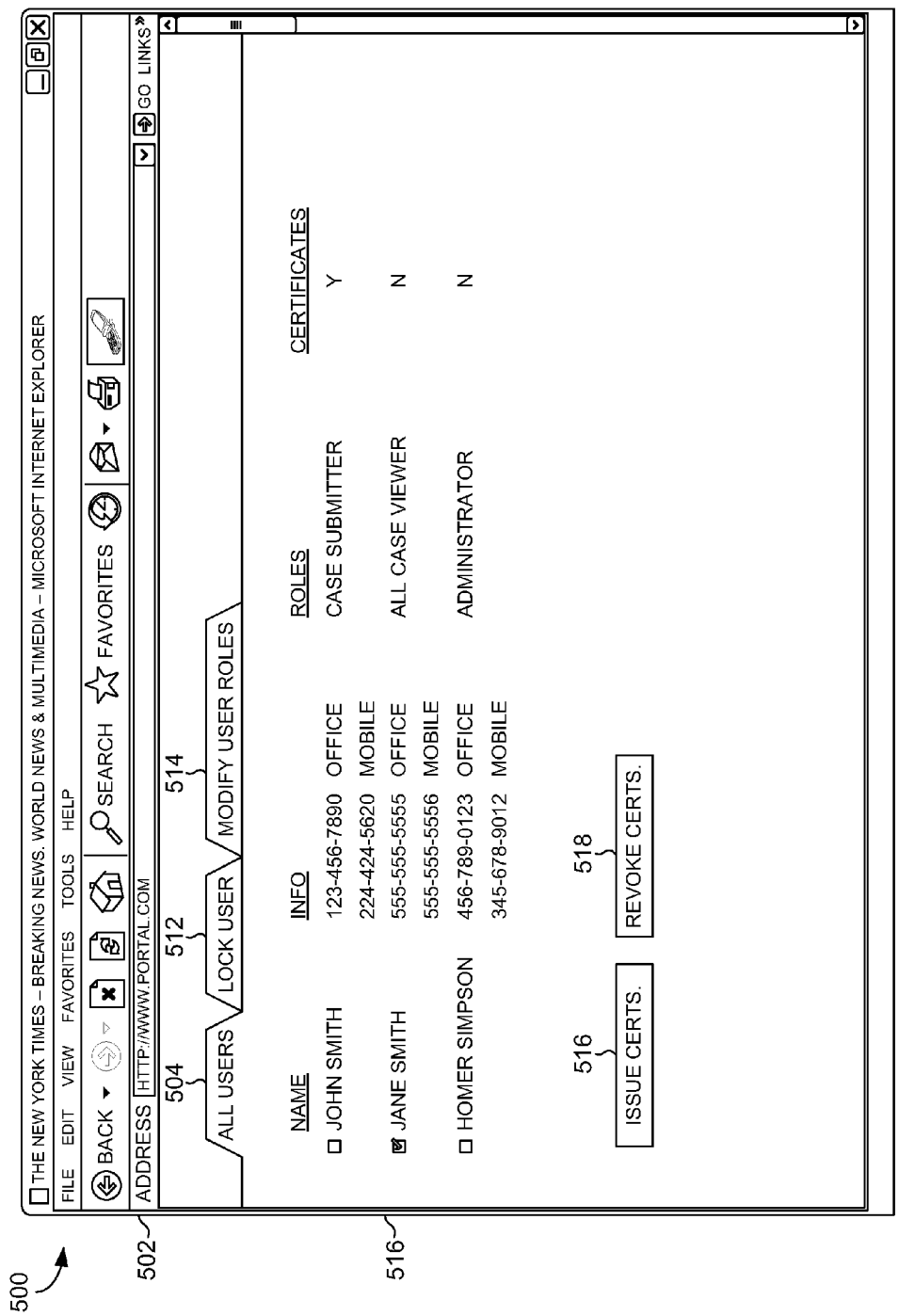
FIGS. 5A and 5B are exemplary displays of a graphical user interface displaying a web site for managing digital certificates, according to an embodiment of the present invention.
Figure 5B:

FIGS. 5A and 5B are exemplary displays of a graphical user interface (GUI) 500 displaying a web site for managing digital certificates, according to an embodiment of the present invention. Referring initially to FIG. 5A, GUI 500 depicts a web browser 502 displaying the web site, which can be used by a POC user to issue, revoke, lock, unlock, and change roles associated with slave certificates. In one embodiment, only a POC user can perform the aforementioned actions. The POC user can navigate to the web site and select tabs of actions to perform. In one embodiment, the tabs include ALL USERS 504, LOCK USERS 512, and MODIFY USER ROLES 514 tabs; however, one skilled in the art will appreciate that any tabs are possible. Furthermore, tabs are not necessary. In alternative embodiments, the functionality described herein is presented in various ways on the web site.

By selecting the ALL USERS 504 tab, all users in the entity who have been assigned a slave certificate are presented to the POC user. Additional data about the users may also be listed—such as their name, phone numbers, assigned roles, and whether they are assigned a certificate.

The POC user may choose to issue certificates by selecting the ISSUE CERTS. button 516 or revoke certificates by selecting the REVOKE CERTS. button 518. If the ISSUE CERTS. button 516 is selected, a menu is presented, in one embodiment, that enables the POC user to enter information about the user associated with the slave certificate. Such a menu is illustrated in FIG. 5B. The POC user can then submit a request to create the slave certificate by entering information into the menu and selecting a SUBMIT button 519.

Similar menus may also be presented to the POC user for revoking, locking, unlocking, or modifying user roles associated with slave certificates. One skilled in the art will appreciate, that various web-site configurations may be used in alternative embodiments.

Figure 6:
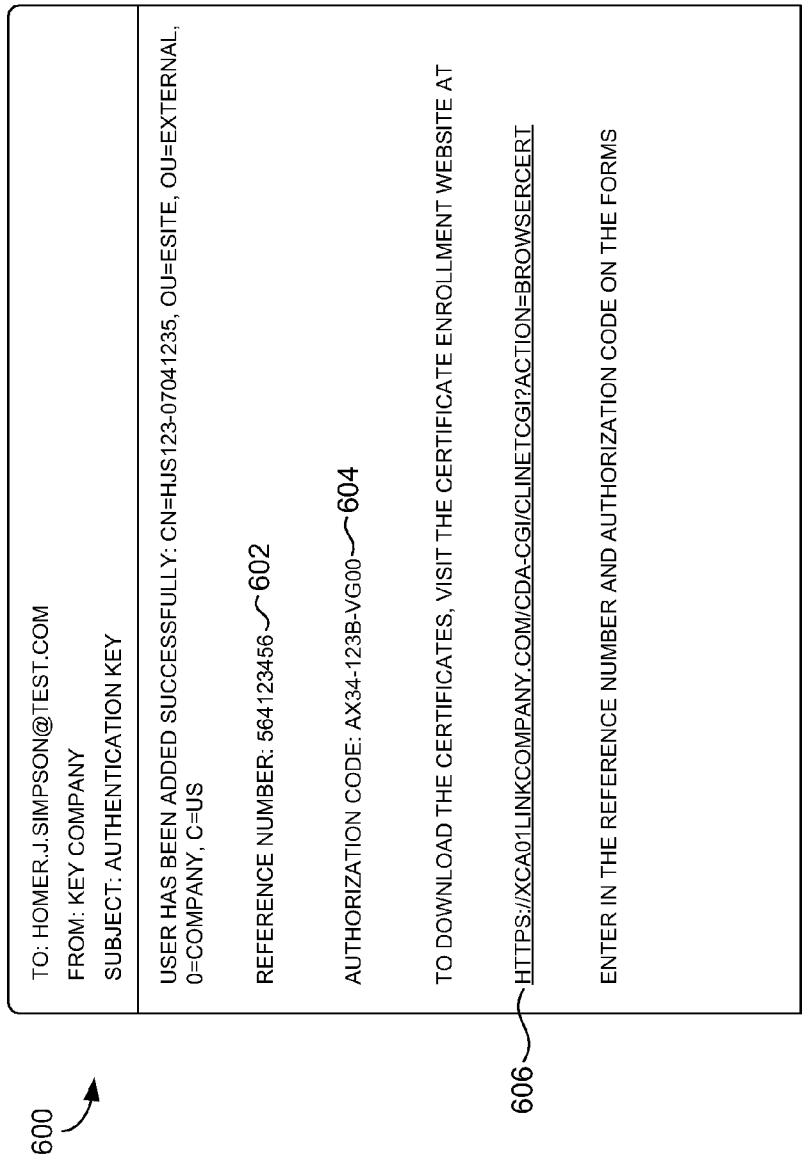
FIG. 6 is an exemplary display of a graphical user interface displaying an electronic mail (e-mail) message with a notification to download a digital certificate, according to an embodiment of the present invention.

FIG. 6 is an exemplary display of a graphical user interface displaying an electronic mail (e-mail) message 600 with a notification to download a digital certificate, according to an embodiment of the present invention. Once a slave certificate is created, a notification is sent to the user for whom the certificate was created. The e-mail message 600 includes a reference number 602, authorization code 604, and a hyperlink 606. The user can select the hyperlink 606, which will request a web page where the slave certificate can be retrieved by entering the correct reference number 602 and authorization code 604.

Figure 7:
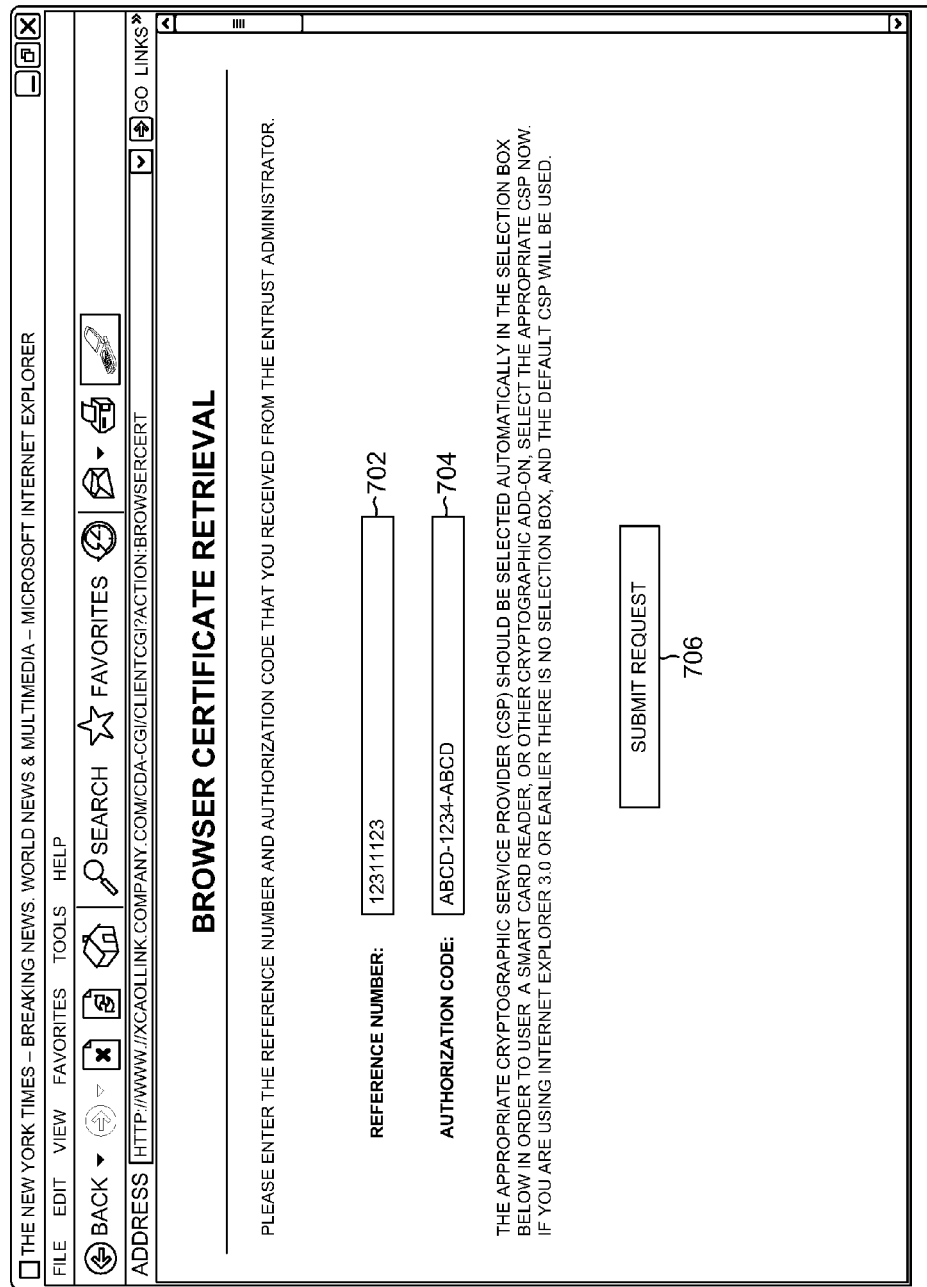
FIG. 7 is an exemplary display of a graphical user interface displaying a web page for provisioning and managing digital certificates, according to an embodiment of the invention.

An exemplary illustration of such a web page is shown in FIG. 7. The user can enter the reference number 602 and the authorization code 604 into text fields 702 and 704. When the user selects the SUBMIT REQUEST button 706, the entered number and code are sent to a server (e.g., the authentication server 202) to verify they match the reference number 602 and the authorization code 604 communicated in the e-mail message 600. If they match, the server transmits the issued slave certificate to the user's web browser, in one embodiment.

The invention claimed is:

1. One or more non-transitory computer-readable media ("media") having computer-executable instructions embodied thereon for creating a slave digital certificate comprising:
receiving a request from a first user assigned to a master profile to create the slave digital certificate for a second user;
authenticating the request from the first user;
creating the slave digital certificate for the second user, the second user not being able to request records from the telecommunications provider without the slave digital certificate, the telecommunications provider only authenticating the requests for records and not the second user submitting the request; and
transmitting the slave digital certificate;
wherein receiving a second request from the first user to lock the slave digital certificate and based on the second request, locking the slave digital certificate;
and further wherein receiving a third request from the first user to modify a role associated with the slave digital certificate and based on the third request, modifying the role associated with the slave digital certificate.

2. The media of claim 1, wherein the first and second user are associated with a common entity.

3. The media of claim 2, wherein the common entity is a law-enforcement agency.

4. The media of claim 1, wherein the one or more telecommunication records include at least one of a telecommunication subscriber's phone records, incoming calls, outgoing calls, text messages, voice messages, geographic location, GPS location, or subscriber number.

5. The media of claim 1, further comprising submitting fourth request from the second user to retrieve the one or more telecommunication records, wherein the second request comprises an indicia of a subpoena.

6. The media of claim 1, further comprising transmitting a notification of the slave digital certificate, wherein the notification comprises a reference that allows access to the slave digital certificate.

7. The media of claim 1, wherein the master profile comprises a software certificate based on the X.509 standard for a public key infrastructure.

8. One or more non-transitory computer-readable media ("media") having computer-executable instructions embodied thereon for issuing a slave digital certificate at the request of a first user for a second user, comprising:

assigning a master profile to an entity, wherein the master profile enables a first user associated with the entity to authorize the issuance of slave digital certificates for other users associated with the entity;

receiving a request from the first user to create the slave digital certificate for the second user using the master profile;

authenticating the request from the first user;

creating the slave digital certificate for the second user, the second user not being able to submit requests for records to a telecommunications provider without the slave digital certificate; and transmitting the slave digital certificate;

wherein receiving a second request from the first user to lock the slave digital certificate and based on the second request, locking the slave digital certificate;

and further wherein receiving a third request from the first user to modify a role associated with the slave digital certificate and based on the third request, modifying the role associated with the slave digital certificate.

9. The media of claim 8, wherein the slave digital certificate is a software certificate based on the X.509 standard for a public key infrastructure.

10. A system for creating a slave digital certificate, comprising:

a certificate provisioning server configured to receive a request to issue the slave digital certificate to a second user and determine whether the request was submitted by a first user with a master profile, wherein the second user is not able to request records from a telecommunications provider without the slave digital certificate, and further wherein the telecommunications provider only needs to authenticate the requests for records and does not need to authenticate the second user submitting the request; and an authentication server configured to authenticate the request and communicate a notification to the first user when the slave digital certificate is issued, wherein the notification includes a reference that allows access to the slave digital certificate, the authentication server being further configured to receive a second request from the first user to lock the slave digital certificate and based on the second request the authentication server locks the slave digital certificate, the authentication server being further configured to receive a third request from the first user to modify a role associated with the slave digital certificate and based on the third request the authentication server modifies the role associated with the slave digital certificate.

11. The system of claim 10, further comprising a web server hosting a web site, which is accessible to the first user, wherein the first user can access the telecommunications records by submitting record requests on the web site.

12. The system of claim 10, further comprising a tracking server configured to return indications of the telecommunication records to the first user if the first user submits a second request for the telecommunication records and has downloaded the slave digital certificate.

13. The system of claim 10, further comprising a client computing device configured to communicate the request for the slave digital certificate.

14. The system of claim 13, wherein the request is entered on the client computing device by the second user.

15. The system of claim 10, wherein the authentication server is further configured to:

receive a fourth request from the first user to revoke at least one slave digital certificate; and based on the request, revoking the at least one slave digital certificate.

16. The system of claim 10, wherein the role may be at least one of an administrator, a viewer of all cases related to an entity with the first user, or a viewer of only cases associated with the first user.

17. The system of claim 10, wherein the slave digital certificate is a software certificate based on the X.509 standard for a public key infrastructure.

* * * * *